US012078129B2

(12) United States Patent
Anders et al.

(10) Patent No.: US 12,078,129 B2
(45) Date of Patent: Sep. 3, 2024

(54) GASEOUS FUEL ENGINE HAVING NON-AXISYMMETRIC FUEL ADMISSION VALVE AND METHOD

(71) Applicant: Caterpillar Inc., Peoria, IL (US)

(72) Inventors: Jonathan W. Anders, Peoria, IL (US); Bobby John, Peoria, IL (US); Chad Palmer Koci, Washington, IL (US); Naga Krishna Chaitanya Kavuri, Richardson, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/082,099

(22) Filed: Dec. 15, 2022

(65) Prior Publication Data

US 2024/0200513 A1 Jun. 20, 2024

(51) Int. Cl.
*F02M 21/02* (2006.01)
*F02F 1/24* (2006.01)

(52) U.S. Cl.
CPC ............. *F02M 21/023* (2013.01); *F02F 1/24* (2013.01); *F02F 2001/244* (2013.01)

(58) Field of Classification Search
CPC .. F02M 21/023; F01L 1/32; F01L 1/46; F02F 1/24; F02F 1/244
See application file for complete search history.

(56) References Cited

U.S. PATENT DOCUMENTS

| | | | | |
|---|---|---|---|---|
| 5,081,965 | A | 1/1992 | Walters et al. | |
| 5,709,183 | A | 1/1998 | Macfarlane et al. | |
| 6,679,219 | B1 * | 1/2004 | Pacinelli | F01L 3/06 123/188.8 |
| 7,913,673 | B2 * | 3/2011 | Vanderslice | F02D 19/0631 123/431 |
| 11,125,123 | B1 | 9/2021 | Hattiangadi et al. | |

FOREIGN PATENT DOCUMENTS

| | | | |
|---|---|---|---|
| EP | 1936171 | A1 | 6/2008 |
| JP | 2005256773 | A | 9/2005 |

* cited by examiner

*Primary Examiner* — Grant Moubry
*Assistant Examiner* — James G Moubry
(74) *Attorney, Agent, or Firm* — Brannon Sowers & Cracraft PC

(57) ABSTRACT

A gaseous fuel engine includes an engine housing having a cylinder block with a combustion cylinder therein, and an engine head including an intake port, an exhaust port, a fuel port, and an igniter bore, each extending to a fire deck. The gaseous fuel engine includes a fuel admission valve movable to close and open the fuel port. A non-axisymmetric clearance is defined between an inner port surface and the fuel admission valve and directionally biases a flow of gaseous fuel from the fuel port. Related methodology is also disclosed.

20 Claims, 3 Drawing Sheets

GASEOUS FUEL ENGINE HAVING NON-AXISYMMETRIC FUEL ADMISSION VALVE AND METHOD

TECHNICAL FIELD

The present disclosure relates generally to a gaseous fuel engine, and more particularly to a non-axisymmetric fuel admission valve and operation thereof in a gaseous fuel engine.

BACKGROUND

Internal combustion engines operate by delivering a combustible fuel into a cylinder where the fuel is ignited with air to produce a controlled combustion reaction causing a rapid rise in temperature and pressure that moves a piston. While all manner of different fuels have been the subject of experimentation in engines for well over a century, recent years have seen continued and even increased interest in the use of certain gaseous fuels. Operation of an engine using a gaseous fuel, or a dual fuel combination of a gaseous fuel and a liquid fuel, may be associated with reduced emissions of certain types.

Gaseous fuels commonly used include natural gas, methane, and various blends. In one typical gaseous fuel engine design the gaseous fuel is admitted by way of fumigation into an intake system, whereas in others the gaseous fuel is injected closer to combustion cylinders at port injection locations or directly injected. A variety of mechanisms are used for igniting a gaseous fuel charge, including spark ignition, prechamber spark ignition, and liquid fuel ignition where a small shot of a liquid fuel compression ignites to initiate combustion of a larger, main charge of gaseous fuel.

Known systems and strategies have worked well for many years. There remains room for improvement, however, particularly with regard to how gaseous fuels are admitted into cylinders and dispersed. In some instances, it can be desirable for the gaseous fuel to mix relatively thoroughly with air within the cylinder, whereas in other instances it can be less important or even undesirable to achieve thorough mixing. One known internal combustion engine design capable of utilizing gaseous fuel is set forth in U.S. Pat. No. 9,188,069 B2 to Steffen.

SUMMARY OF THE INVENTION

In one aspect, a gaseous fuel engine includes an engine housing having a cylinder block with a combustion cylinder formed therein, and an engine head including a fire deck, and an intake port, an exhaust port, a fuel port, and an igniter bore, each extending to the fire deck. The gaseous fuel engine further includes a fuel admission valve defining an axis of reciprocation and translatable relative to the engine head along the axis of reciprocation between a closed position blocking the fuel port, and an open position. The fuel port includes an inner port surface. A clearance is defined between the inner port surface and the fuel admission valve and is non-axisymmetric circumferentially around the axis of reciprocation.

In another aspect, a method of operating a gaseous fuel engine includes opening an intake valve in an engine to convey pressurized air into a combustion cylinder in the engine, and opening a fuel admission valve defining an axis of reciprocation and positioned at least partially within a fuel port formed in an engine head of the engine. The method further includes conveying a gaseous fuel through the fuel port into the combustion cylinder, and directing a flow of the gaseous fuel from the fuel port into the combustion cylinder in a directionally biased flow pattern that is based on a non-axisymmetric profile of a clearance within the fuel port. The method further includes combusting the gaseous fuel and pressurized air within the combustion cylinder.

In still another aspect, an engine head assembly includes an engine head having formed therein an intake port, an exhaust port, a fuel port, and an igniter bore, each extending to a fire deck. The igniter bore defines an igniter bore axis, and the intake port and the exhaust port extend, respectively, to a plurality of intake openings and a plurality of exhaust openings, each having a distribution circumferentially around the igniter bore axis. The engine head assembly further includes a fuel admission valve defining an axis of reciprocation and translatable relative to the engine head between a closed position blocking the fuel port, and an open position. A clearance is defined between the engine head and the fuel admission valve within the fuel port and is non-axisymmetric, circumferentially around the axis of reciprocation, such that a flow of gaseous fuel from the fuel port is directionally biased.

DETAILED DESCRIPTION

Figure 1:
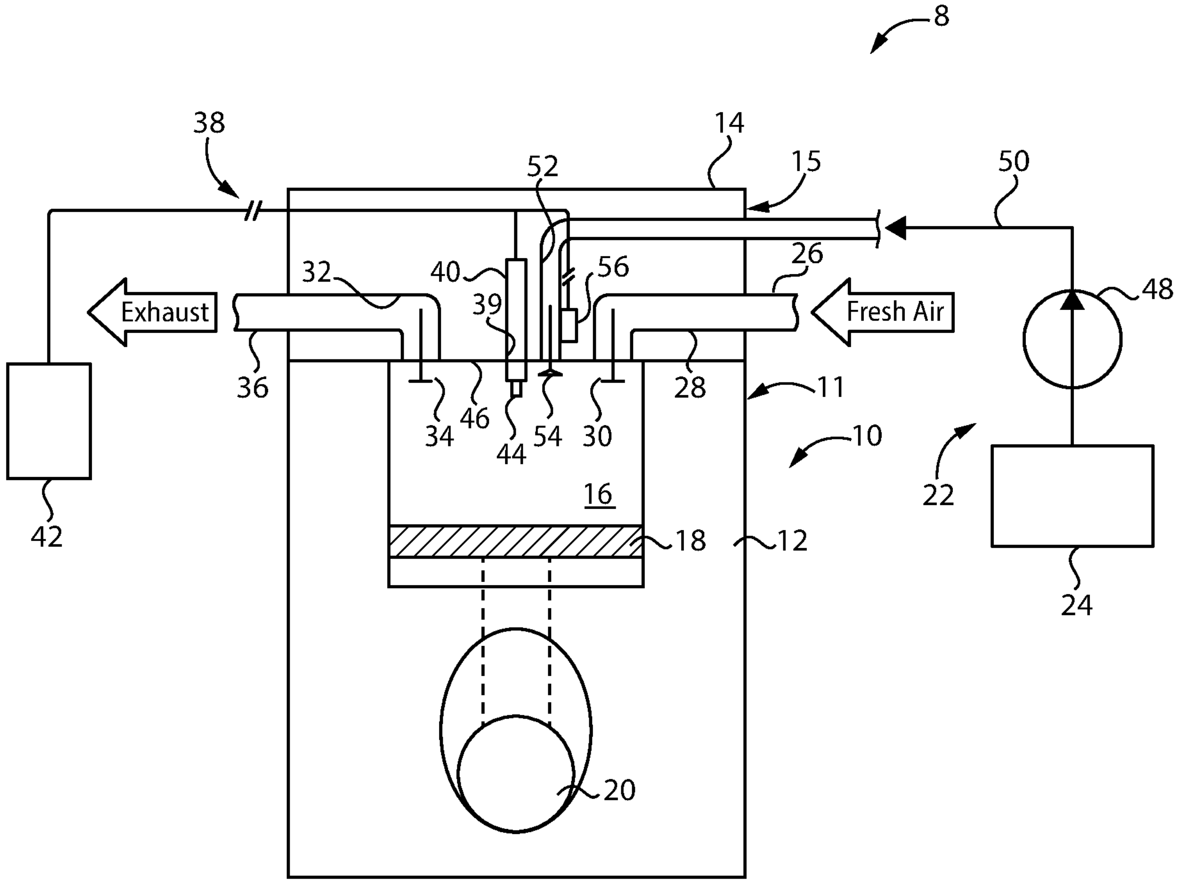
FIG. 1. is a diagrammatic view of a gaseous fuel engine system, according to one embodiment.

Referring to FIG. 1, there is shown a gaseous fuel engine system 8 including a gaseous fuel engine 10, according to one embodiment. Gaseous fuel engine 10 includes an engine housing 11 having a cylinder block 12 and an engine head 14 attached to cylinder block 12. Cylinder block 12 has one or more combustion cylinders 16 formed therein, one of which is shown in FIG. 1. Engine 10 can include any number of combustion cylinders in any suitable arrangement such as an inline pattern, a V-pattern, or still another. Combustion cylinder 16, hereinafter referred to in the singular, has a piston 18 positioned at least partially therein and movable between a bottom dead center position and a top dead center position to rotate a crankshaft 20 in a generally conventional manner. Engine head 14 includes a fire deck 46, and an intake port 28, an exhaust port 32, a fuel port 52, and an igniter bore 39, each extending to fire deck 46.

A gaseous fuel engine as contemplated herein includes an engine structured to operate, at least at times, principally on a gaseous fuel such as natural gas, methane, ethane, landfill gas, biogas, hydrogen gas, various blends of these and still others. A gaseous fuel engine as contemplated herein might also include a dual fuel engine where a pilot quantity of a liquid fuel, such as a diesel distillate fuel, is directly injected into cylinder 16 to compression ignite and initiate combustion of a larger, main charge of a gaseous fuel.

Engine system 8 also includes a fuel system 22 having a fuel supply 24, a fuel pump 48, and a fuel conduit 50 extending to engine head 14. Fuel supply 24 could include a supply of cryogenically stored liquified natural gas (LNG), a pressurized gaseous fuel in a storage vessel, or a connection to a line gas supply such as might be available at a well field or a mine, for example. An intake conduit 26 extends to intake port 28 to provide a supply of pressurized intake air, typically from a compressor in a turbocharger, to intake port 28 and thenceforth into cylinder 16 by way of an intake valve 30. Exhaust port 32 extends to an exhaust conduit 36 by way of an exhaust valve 34. Exhaust from exhaust conduit 36 can be conveyed to suitable aftertreatment apparatus in some embodiments.

An igniter 38 is supported in engine head 14 within igniter bore 39. Igniter 38 can include a sparkplug forming a spark gap 44 within cylinder 16. Spark gap 44 could be located within a prechamber in a sparkplug in some embodiments. In still other instances a prechamber ignition device having a spark gap within a prechamber and being equipped with a direct feed of a combustible liquid or gaseous fuel might also be used. As alluded to above, an igniter within the scope of the present disclosure could include a liquid fuel injector. An electronic control module (ECM) 42 in an ignition system 38 operates igniter 40 in the illustrated embodiment. Engine head 14 and some or all of the components formed in or supported in engine head 14 may comprise an engine head assembly 15.

Figure 2:
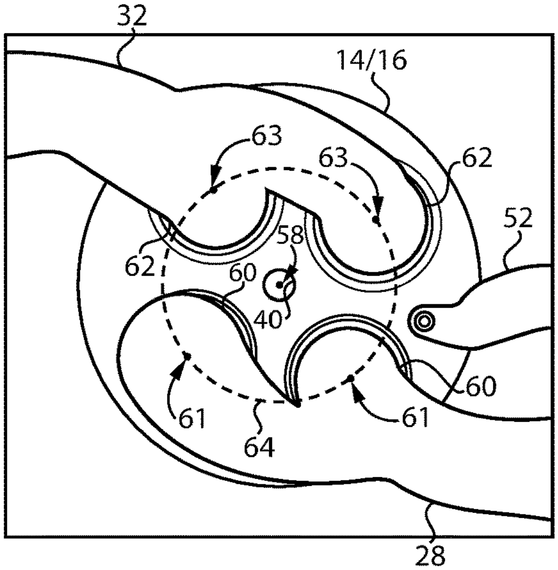
FIG. 2. is a diagrammatic view of portions of an engine head, according to one embodiment.

Referring also now to FIG. 2, there is shown another view of engine head 14 and combustion cylinder 16 illustrating features for supply and removal of fuel, air, exhaust. In an embodiment, igniter bore 39 defines a centrally located igniter bore axis 58. Intake port 28 and exhaust port 32 extend, respectively, to a plurality of intake openings 60 and a plurality of exhaust openings 62 each having a distribution circumferentially around igniter bore axis 58. In the illustrated embodiment a total of two intake openings 60 and a total of two exhaust openings 62 are provided each of which will be equipped with a respective gas exchange valve. Also in the illustrated embodiment, intake openings 60 and exhaust openings 62 define a respective plurality of center axes 61 and 63. A circle 64 is defined by the respective plurality of center axes 61 and 63.

Gaseous fuel engine 10 also includes a fuel admission valve 54. Fuel admission valve 54 defines an axis of reciprocation 66, shown in drawings later described, and is translatable relative to engine head 14 along axis of reciprocation 66 between a closed position blocking fuel port 52, and an open position not blocking fuel port 52. An actuator 56 is coupled with fuel admission valve 54.

Figure 3:
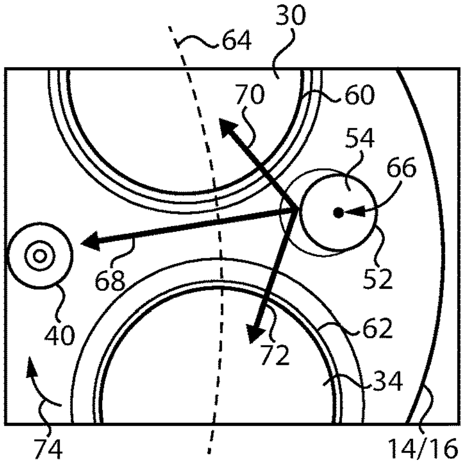
FIG. 3. is a diagrammatic bottom view of portions of an engine head assembly, according to one embodiment.
Figure 4:
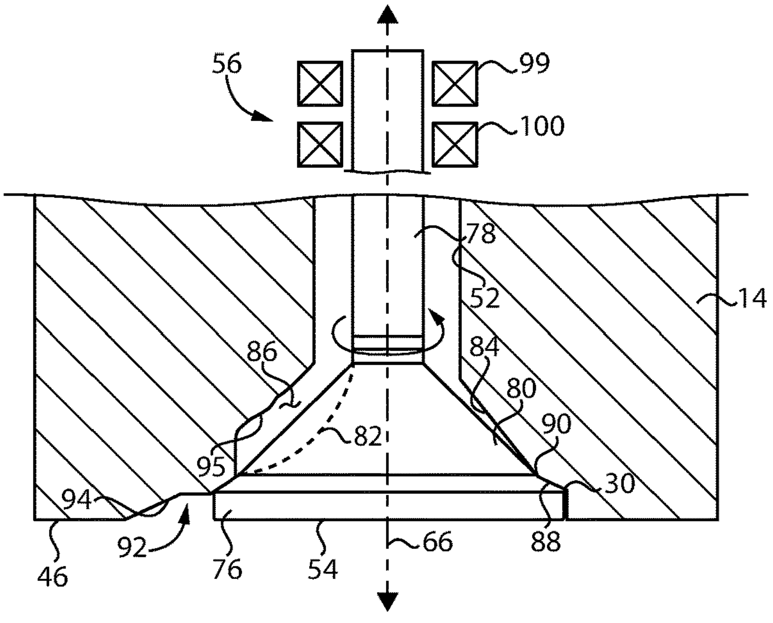
FIG. 4. is a diagrammatic view of a fuel admission valve within an engine head, according to one embodiment.

Referring also now to FIGS. 3 and 4, actuator 56 may include a lift actuator 99 and a rotation actuator 100. Lift actuator 99 may include any of a variety of electrical, hydraulic, electrohydraulic, or mechanical actuators. In an embodiment, lift actuator 99 includes a solenoid actuator structured to magnetically attract an armature attached to or operably coupled to fuel admission valve 54. A piezoelectric actuator, a pilot-operated electrohydraulic actuator or still others might be used. Rotation actuator 100 may likewise include any of a variety of electrical, hydraulic, electrohydraulic, or mechanical actuators, such as a ball screw drive, an electric motor, or still others.

It can further be noted from FIG. 3 that axis of reciprocation 56 is located outside of circle 64 in the illustrated embodiment. Fuel admission valve 54 may be rotatable about axis of reciprocation 66 by way of rotation actuator 100. FIG. 3 illustrates a first direction 68, a second direction 70, and a third direction 72. In some circumstances it can be desirable to directionally bias a flow of gaseous fuel from fuel port 52. It may further be desirable to have the capability of adjusting a directional bias of fuel flow from fuel port 52. In some instances, a flow of fuel from fuel port 52 may be directionally biased in first direction 68 towards igniter bore 40 (an igniter direction). In other instances, it may be desirable to directionally bias a flow of fuel from fuel port 52 in second direction 70 toward one of intake openings 60 (an intake opening direction) or in third direction 72 (an exhaust opening direction). FIG. 3 also illustrates an exemplary swirl direction 74 approximating a direction of swirled flow of incoming intake air. Embodiments are contemplated where a directional bias of incoming gaseous fuel from fuel port 52 is approximately in or along swirl direction 74.

Directional bias and like terms used herein refer to a mass flow of gaseous fuel tending to occur more in one direction away from axis of reciprocation 66 than in other directions. Thus, directionally biased toward igniter bore 40 means that a volume of gaseous fuel flow in first direction 68 away from fuel port 52 is greater than volumes of gaseous fuel flow in any other direction away from fuel port 52. The geometry of at least one of fuel admission valve 54 or fuel port 52 enables directionally biasing a flow of gaseous fuel as well as varying the directional biasing as further discussed herein.

To this end, fuel port 52 includes an inner port surface 84, and a clearance 86 is defined between inner port surface 84 and fuel admission valve 54. Clearance 86 is non-axisymmetric circumferentially around axis of reciprocation 66, such that a flow of gaseous fuel from fuel port 52 is directionally biased. Focusing now on FIG. 4, fuel admission valve 54 includes a valve head 76, a valve stem 78, and a fillet 80 transitioning between valve head 76 and valve stem 78. Fillet 80 may have a non-uniform profile, in facing relation to inner port surface 84, circumferentially around axis of reciprocation 66. A scallop 82 formed in fillet 80 defines in part the non-uniform profile and defines in part the non-axisymmetric shape of clearance 86. Scallop 82 may be formed by removal of material from fillet 80, providing additional flow area for outgoing gaseous fuel when fuel admission valve 54 is open, causing relatively more of the gaseous fuel to be admitted in a general area of scallop 82 than elsewhere. Fuel admission valve 54 itself may be understood as non-axisymmetrically featured, including a shape that is not symmetric circumferentially around axis of reciprocation 66. Parts of fuel admission valve 54 may be axisymmetric, however, including a typically circular configuration of a valve seating surface 90. References herein to "non-axisymmetric" refer to parts of fuel admission valve 54 and/or fuel port 52 that do not perform a sealing function.

Referring back to FIG. 3, by rotating fuel admission valve 54 scallop 82 might be oriented generally to face first direction 68, oriented to face second direction 70, or oriented to face third direction 72 to obtain directional biasing in any of the respective directions. Fuel admission valve 54 may thus be understood to define a plurality of different directionally biased flow patterns at a plurality of different angular orientations about axis of reciprocation 66. A first one of the plurality of different angular orientations about axis of reciprocation 66 may define a first one of the plurality of different directionally biased flow patterns that is directionally biased towards igniter bore 40. At a second one of the plurality of different angular orientations a second one of the plurality of different directionally biased flow patterns might be defined, at a third angular orientation a third directionally biased flow pattern defined, and so on.

Engine head 14 may further form a valve seat 88, from casted and machined engine head material or from an interference fitted valve seat insert within engine head 14, for example. Valve head 76 may include conical or spherical, for example, valve seating surface 90 that contacts valve seat 88 at the closed position, and does not contact valve seat 88 at the open position.

Engine head 14 may further include structure for cooperating with fuel admission valve 54 in producing the directionally biased flow patterns. To this end, engine head 14 may include a flow feature 92 within fuel port 52. Fuel admission valve 54 may be rotatable between a first angular orientation about axis of reciprocation 66 at which scallop 82 is in alignment with flow feature 92, and a second angular orientation at which scallop 82 is not in alignment with flow feature 92. Between the first angular orientation and the second angular orientations different relative extents of alignment between scallop 82 and flow feature 92 may be obtained.

In the illustrated embodiment flow feature 92 includes a first profile relief feature 94 formed on a first axial side of valve seat 96 and a second profile relief feature 95 formed on a second axial side of valve seat 96. A profile relief feature may include a negative profile relief feature as illustrated, where material of engine head 14 within fuel port 52 is removed to provide additional space for gaseous fuel to flow. Embodiments are contemplated where a profile relief feature is formed on only one of a first axial side and a second axial side of a valve seat, as well as embodiments where no profile relief feature is used at all and instead directionally biasing of gaseous fuel flow is achieved solely by way of features such as a scallop on fuel admission valve 54.

Figure 5:
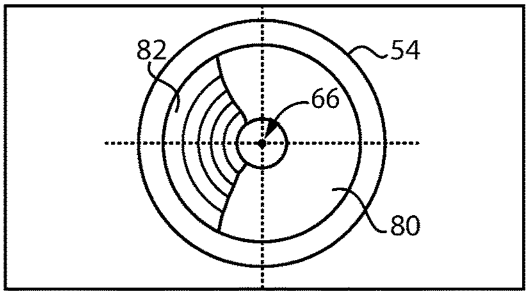
FIG. 5. is a top view of a fuel admission valve, according to one embodiment.
Figure 6:
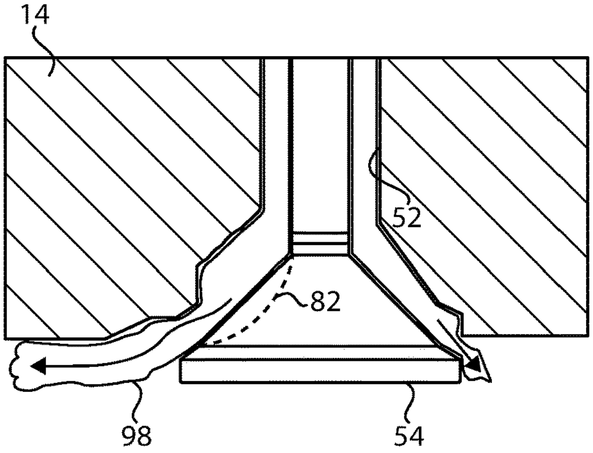
FIG. 6. is a diagrammatic view of a fuel admission valve in an engine head illustrating an example fuel flow pattern, according to one embodiment.

Referring now also to FIG. 5, there is shown a top view of fuel admission valve 54 illustrating scallop 82. Scallop 82 may extend angularly around axis of reciprocation 66 to any suitable extent, including a range from approximately 60 degrees to approximately 120 degrees as shown in FIG. 5. Referring also now to FIG. 6, there is shown a view of fuel admission valve 54 as it might appear open and admitting a flow of gaseous fuel 98. It can be noted from the illustration that a flow generally in alignment with scallop 82 is greater than a flow at a opposite side of fuel admission valve 54.

Figure 7:
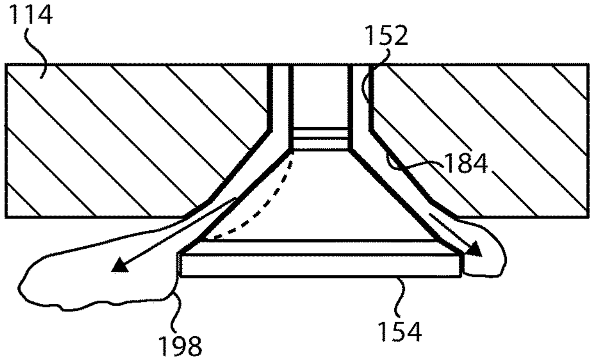
FIG. 7. is a diagrammatic view of a fuel admission valve in an engine head according to another embodiment and illustrating an example fuel flow pattern.

Turning to FIG. 7, there is shown a view of a fuel admission valve 154 within an engine head 114 as it might appear in an open position and admitting a flow of gaseous fuel 198. Fuel admission valve 154 is positioned at least partially within a fuel port 152 in engine head 114 and having an inner port surface 184. Inner port surface 184 is understood as axisymmetric in contrast to the preceding embodiment where inner port surface 84 is non-axisymmetric.

Figure 8:
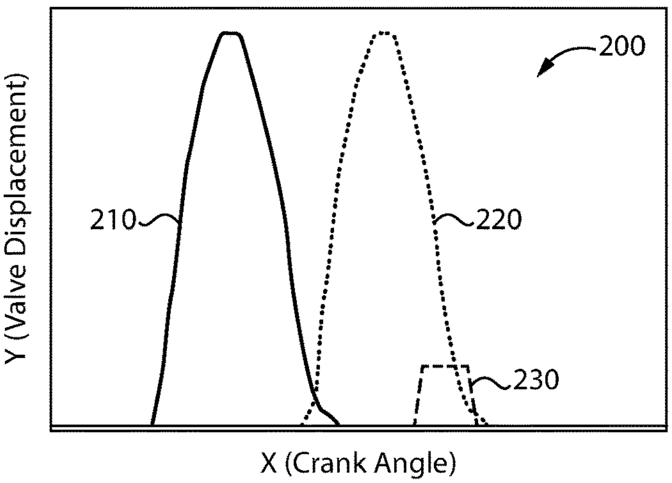
FIG. 8. is a graph showing valve positions in an engine cycle, according to one embodiment.

Referring now to FIG. 8, there is shown example valve displacement for an exhaust valve 210, an intake valve 220, and a fuel admission valve 230 in a graph 200. Valve displacement is shown on the Y-axis and crank angle is shown on the X-axis. It can be noted that exhaust valve 210 opens and closes as might be expected in an exhaust stroke in a typical 4-stroke engine cycle, followed by opening and closing of intake valve 220. Intake valve 220 may be closed approximately at a bottom dead center (BDC) position of the associated piston 180 crank angle degrees before a top dead center (TDC) position. Gaseous fuel admission valve 230 may be opened approximately when intake valve 220 is fully open, gaseous fuel admission valve 230 held at its open position for a duration, and then closed typically just before intake valve 220 closes at the beginning of a compression stroke in the associated engine. Other phasings of fuel admission valve 230 are within the scope of the present disclosure.

INDUSTRIAL APPLICABILITY

Referring to the drawings generally, operating a gaseous fuel engine according to the present disclosure may include opening an intake valve to convey pressurized air into a combustion cylinder in the engine. Typically while the intake valve is open, although not necessarily, a fuel admission valve may be opened to convey a gaseous fuel through a fuel port as discussed herein into a combustion cylinder. A flow of the gaseous fuel from the fuel port into the combustion cylinder may be directed in a directionally biased flow pattern that is based on a non-axisymmetric profile of a clearance within a fuel port defined between an inner port surface and the fuel admission valve. The gaseous fuel and pressurized air may be combusted within the combustion cylinder such as by way of spark ignition.

It is contemplated that the use of different directionally biased flow patterns may be advantageous when operating under different engine conditions. For example, is some instances it may be desirable to advance gaseous fuel directly towards an ignition source. In other instances it may be desirable to more thoroughly mix gaseous fuel with air prior to ignition. In a practical implementation, fuel admission valve 54 may be rotated from a first angular orientation about axis of reciprocation 66 in a first engine cycle to a second angular orientation about axis of reciprocation 66 in a second engine cycle. In the first engine cycle a flow of gaseous fuel from the fuel port may be directed in a first directionally biased flow pattern. In the second engine cycle a second flow of the gaseous fuel may be directed in a second flow pattern different from the directionally biased flow pattern, such as a second, different directorially biased flow pattern.

At least one of an engine load or an engine speed may be lower in the first engine cycle and the first directionally biased flow pattern may be directionally biased in a first target direction. At least one of an engine load or an engine speed may be higher in the second engine cycle, and the second flow pattern may include a second directionally biased flow pattern directionally biased in a second target direction different from the first target direction. The first target direction might include an igniter direction, and the second target direction might include an intake valve direction, an exhaust valve direction, or a swirl direction, for example.

In this way, when ignition may be relatively more difficult to achieve, such as when an engine is operating on a lean mixture of gaseous fuel and air and/or at a low load, the fuel may be delivered predominantly towards the ignition source such as a spark igniter. At higher loads and/or at potentially richer fuel and air mixtures where ignition is relatively easier to achieve the gaseous fuel may be more thoroughly mixed. Those skilled in the art will envision various other situational factors affecting where and when one might choose to directionally bias a flow of admitted gaseous fuel.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be openended terms. Further, the phrase "based on" is intended to mean "based, at least in part, on" unless explicitly stated otherwise.

What is claimed is:

1. A gaseous fuel engine comprising:

an engine housing including a cylinder block having a combustion cylinder formed therein, and an engine head including a fire deck, and an intake port, an exhaust port, a fuel port, and an igniter bore, each extending to the fire deck;

a fuel admission valve defining an axis of reciprocation and translatable relative to the engine head along the axis of reciprocation between a closed position blocking the fuel port, and an open position; and the fuel port including an inner port surface, and a clearance is defined between the inner port surface and the fuel admission valve and is non-axisymmetric circumferentially around the axis of reciprocation.

2. The gaseous fuel engine of claim 1 wherein the fuel admission valve is rotatable about the axis of reciprocation.

3. The gaseous fuel engine of claim 2 wherein the fuel admission valve includes a valve head, a valve stem, and a fillet transitioning between the valve head and the valve stem.

4. The gaseous fuel engine of claim 3 wherein the fillet includes a non-uniform profile, in facing relation to the inner port surface, circumferentially around the axis of reciprocation.

5. The gaseous fuel engine of claim 4 wherein a scallop is formed in the fillet.

6. The gaseous fuel engine of claim 5 wherein the engine head includes a flow feature within the fuel port, and the fuel admission valve is rotatable between a first angular orientation about the axis of reciprocation at which the scallop is in alignment with the flow feature, and a second angular orientation at which the scallop is not in alignment with the flow feature.

7. The gaseous fuel engine of claim 6 wherein the engine head includes a valve seat contacted by the fuel admission valve at the closed position, and the flow feature includes a first profile relief feature formed on a first axial side of the valve seat and a second profile relief feature formed on a second axial side of the valve seat.

8. A method of operating a gaseous fuel engine comprising:

opening an intake valve in an engine to convey pressurized air into a combustion cylinder in the engine;

opening a fuel admission valve defining an axis of reciprocation and positioned at least partially within a fuel port formed in an engine head of the engine;

conveying a gaseous fuel through the fuel port into the combustion cylinder;

directing a flow of the gaseous fuel from the fuel port into the combustion cylinder in a directionally biased flow pattern that is based on a non-axisymmetric profile of a clearance within the fuel port; and combusting the gaseous fuel and pressurized air within the combustion cylinder.

9. The method of claim 8 wherein the clearance is defined between an inner port surface of the fuel port and the fuel admission valve.

10. The method of claim 9 wherein the fuel admission valve includes a fillet, and the non-axisymmetric profile is defined in part by a scallop formed in the fillet.

11. The method of claim 9 wherein the engine head includes a profile relief feature formed by the inner port surface, and the non-axisymmetric profile is defined in part by the profile relief feature.

12. The method of claim 9 further comprising:

rotating the fuel admission valve from a first angular orientation about the axis of reciprocation in a first engine cycle to a second angular orientation about the axis of reciprocation in a second engine cycle; and directing a second flow of the gaseous fuel from the fuel port into the combustion cylinder in a second engine cycle in a second flow pattern different from the directionally biased flow pattern.

13. The method of claim 12 wherein:

at least one of an engine load or an engine speed is lower in the first engine cycle and the directionally biased flow pattern is directionally biased in a first target direction; and the at least one of an engine load or an engine speed is higher in the second engine cycle, and the second flow pattern is directionally biased in a second target direction different from the first target direction.

14. The method of claim 13 wherein the first target direction includes an igniter direction.

15. An engine head assembly comprising:

an engine head having formed therein an intake port, an exhaust port, a fuel port, and an igniter bore, each extending to a fire deck;

the igniter bore defining an igniter bore axis, and the intake port and the exhaust port extending, respectively, to a plurality of intake openings and a plurality of exhaust openings, each having a distribution circumferentially around the igniter bore axis;

a fuel admission valve defining an axis of reciprocation and translatable relative to the engine head between a closed position blocking the fuel port, and an open position; and a clearance is defined between the engine head and the fuel admission valve within the fuel port and is non-axisymmetric, circumferentially around the axis of reciprocation, such that a flow of gaseous fuel from the fuel port is directionally biased.

16. The engine head assembly of claim 15 wherein the plurality of intake openings and the plurality of exhaust openings define a respective plurality of center axes, and the axis of reciprocation is located outside of a circle defined by the respective plurality of center axes.

17. The engine head assembly of claim 15 wherein the fuel admission valve includes a valve head, a valve rod, and a fillet transitioning between the valve head and the valve rod, and a scallop is formed in the fillet.

18. The engine head assembly of claim 15 wherein the engine head includes a profile relief feature within the fuel port, and the non-axisymmetric profile is defined at least in part by the profile relief feature.

19. The engine head assembly of claim 15 wherein the fuel admission valve is rotatable about the axis of reciprocation and defines a plurality of different directionally biased flow patterns at a plurality of different angular orientations about the axis of reciprocation.

20. The engine head assembly of claim 19 wherein the fuel admission valve is at a first one of the plurality of different angular orientations about the axis of reciprocation and defining a directionally biased flow pattern in an igniter direction.

* * * * *